June 11, 1957 S. E. LOOMIS 2,795,074
PULL-ACTUATED TRAP-HOOK
Filed July 9, 1956

Samuel E. Loomis
INVENTOR.

BY
Attorneys

United States Patent Office 2,795,074
Patented June 11, 1957

2,795,074
PULL-ACTUATED TRAP-HOOK

Samuel E. Loomis, Lubbock, Tex.

Application July 9, 1956, Serial No. 596,537

1 Claim. (Cl. 43—37)

The present invention relates to that category of fishing devices characterized by a conventional-type fishhook having a slidably mounted speak or trap-hook on the shank thereof, and has more particular reference to the type which is actuated only by a pull, either from the fish or the fisherman, or both, and not by spring or weight.

Briefly, the invention has to do with a fishhook, the shank of which is provided with aligned assembling and guide eyes. A pull projected pointed spear is provided. This is slidable in the eye alongside of the shank of the fishhook and has a coil-type return spring with an eye to which the fishing line is attached to bring about the desired tautening and tensioning of the line and spearing of the victim fish.

Figure 1:
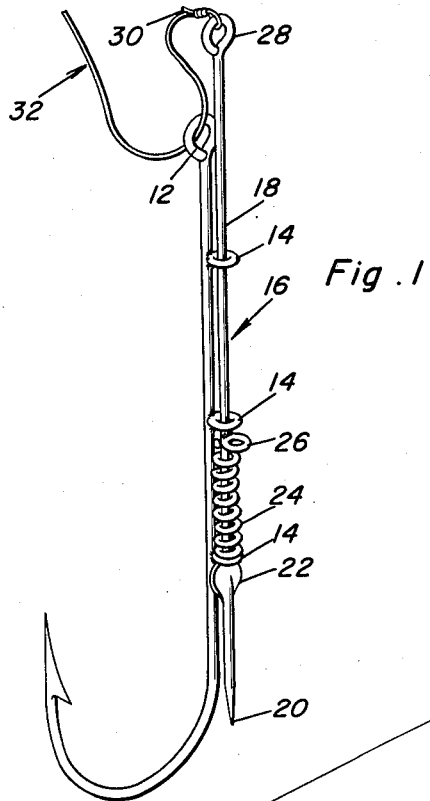
Fig. 1 is a perspective view of the improved line pull actuated trap-hook.

Referring now to the drawings the aforementioned conventional fishhook is denoted by the numeral 4. This comprises, as usual, the straight shank 6 with a curvate bend 8 at one end terminating in a pointed barb or bill 10. The usual line eye is at 12. In the instant situation auxiliary assembling and guide eyes 14 are provided and these are welded to the shank at right angles and are in longitudinally spaced alignment as shown. The projectible pull-actuated spear is denoted by the numeral 16 and it comprises a linearly straight shank 18 slidably mounted in the eyes 14. The leading end of the shank 18 is provided with a penetrating point 20 and a suitable stop shoulder 22 engaging the lowermost eye. Fixed on the shank 18 is a coil spring 24 bearing against the lowermost eye and also against a complemental shoulder-forming eye 26 on the shank 18. There is a line eye 28 at the upper end which is held by the tension of the spring in the normally elevated position seen in Fig. 1. The end 30 of the fishing line 32 is attached permanently to the eye 28. The adjacent sliding portion of the line passes through the fishhook eye 12. Thus when the device is normal and set for use the spear is biased and held by the spring in the ready-to-jab or set position seen in Fig. 1.

Figure 2:
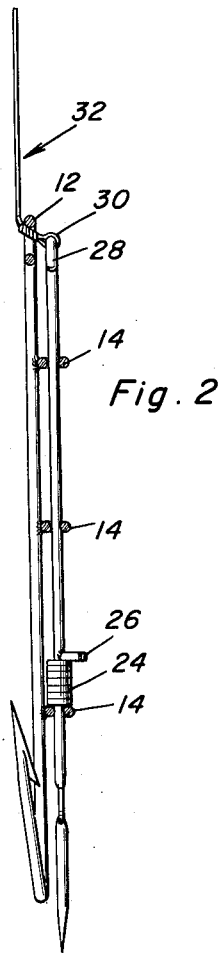
Fig. 2 is a view at right angles to Fig. 1 with portions in section.
Figure 3:
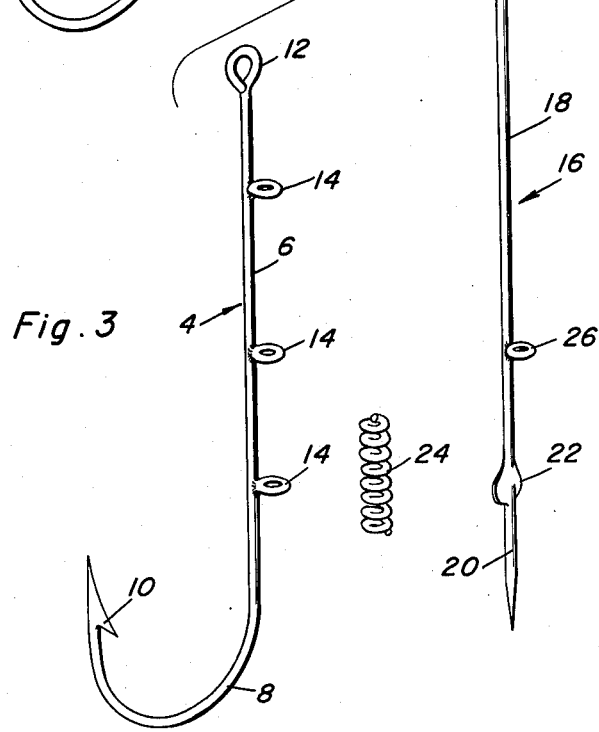
Fig. 3 is an "exploded" perspective view.

It will be evident that the spring does not automatically impel the jabbing spear. It merely keeps the spear in the set ready-to-use position. Therefore, this device is pull-actuated and consequently when the fish has taken the baited hook and the line is payed out, when the line is checked by the fisherman and is placed under tension the line is tauntened and consequently the straight-shank spear comes into play and is forcibly jabbed into the trapped fish as is substantially evident by comparing Fig. 1 with Fig. 2. Fig. 2 therefore shows the spring compressed and the spear supposedly jabbed into the fish.

Changes in shape, size and rearrangement of parts may be resorted to in actual practice without departing from the spirit of the invention or the invention as claimed.

What is claimed as new is as follows:

In combination, a conventional-type fishhook having a linearly straight shank having a line attaching eye at one end and a hook at the other end, and provided intermediate its ends with a plurality of outstanding right angularly disposed axially aligned assembling and guide eyes, a spear also having a linearly straight shank mounted in and slidable through said assembling and guide eyes and in close spaced parallelism in respect to the shank of the fishhook and provided at its upper end with a line attaching eye and at its lower end with a pointed spear and, adjacent the spear with a shoulder normally engaging the lowermost assembling and guide eye, a coil spring fixedly mounted on the shank of said spear and bearing at one end against the lowermost guide eye, the shank of said spear having a shoulder thereon against which the adjacent end of said coil spring bears, and a fishing line having one end attached to the line eye on the shank of the spear and the adjacent end portion passing slidingly through the line eye on the shank of the fishhook.

References Cited in the file of this patent

UNITED STATES PATENTS

| | | |
|---|---|---|
| 1,604,725 | Sprangel | Oct. 26, 1926 |
| 2,260,923 | Thompson | Oct. 28, 1941 |
| 2,619,759 | Penninger | Dec. 2, 1952 |
| 2,640,291 | Garner | June 2, 1953 |